(12) United States Patent
Hargraves et al.

(10) Patent No.: US 8,096,043 B2
(45) Date of Patent: Jan. 17, 2012

(54) METHOD OF ASSEMBLING A PUMP MOTOR AND PRELOADING BEARINGS OF THE MOTOR

(75) Inventors: Donald Edwin Hargraves, Huntersville, NC (US); Douglas Allan Curtis, Troutman, NC (US)

(73) Assignee: Hargraves Technology Corporation, Mooresville, NC (US)

( * ) Notice: Subject to any disclaimer, the term of this patent is extended or adjusted under 35 U.S.C. 154(b) by 0 days.

(21) Appl. No.: 12/701,936

(22) Filed: Feb. 8, 2010

(65) Prior Publication Data

US 2010/0132186 A1 Jun. 3, 2010

Related U.S. Application Data

(63) Continuation of application No. 10/550,256, filed on Sep. 22, 2005, now abandoned.

(30) Foreign Application Priority Data

Apr. 14, 2004 (WO) ................. PCT/US2004/011403

(51) Int. Cl.
*H02K 15/14* (2006.01)
(52) U.S. Cl. .................... 29/596; 29/898.06; 29/898.08; 310/90

(58) Field of Classification Search ............ 29/596–598, 29/732–734, 898.06, 898.08; 310/67 R, 310/75 A, 90–91
See application file for complete search history.

(56) References Cited

U.S. PATENT DOCUMENTS

| 3,990,141 | A | * | 11/1976 | Stark | 29/596 |
| 4,353,002 | A | * | 10/1982 | Kobayashi et al. | 310/64 |
| 4,381,048 | A | * | 4/1983 | Haverkamp et al. | 188/171 |
| 4,471,246 | A | * | 9/1984 | Paillet | 310/90 |
| 5,562,347 | A | * | 10/1996 | Hsieh | 384/215 |
| 5,831,360 | A | * | 11/1998 | Senjo et al. | 310/80 |
| 6,142,749 | A | * | 11/2000 | Jack et al. | 417/395 |
| 6,376,948 | B1 | * | 4/2002 | Li-Yang | 310/77 |
| 6,617,728 | B1 | * | 9/2003 | Wang | 310/77 |
| 2010/0132186 | A1 | * | 6/2010 | Hargraves et al. | 29/598 |

* cited by examiner

*Primary Examiner* — Minh Trinh
(74) *Attorney, Agent, or Firm* — Shumaker, Loop & Kendrick, LLP (57) ABSTRACT

A method of assembling a pump motor and preloading bearings of the motor including providing a housing, an end bell, first and second bearings each having a plurality of rolling elements disposed between an inner race and an outer race, a rotor assembly having a shaft, and a spring, securing the outer races to the housing and end bell, respectively, assembling the spring on the shaft, inserting the rotor assembly into the housing such that the spring bears against the inner race of the first bearing and the rotor assembly, attaching the end bell to the housing, and securing the inner race of each of the first and second bearings to the shaft.

5 Claims, 6 Drawing Sheets

METHOD OF ASSEMBLING A PUMP MOTOR AND PRELOADING BEARINGS OF THE MOTOR

CROSS REFERENCE TO RELATED APPLICATIONS

This non-provisional patent application is a continuation of, and claims the full benefit of priority of, U.S. non-provisional patent application number 10/550,256, Sep. 22, 2005 which is entitled "Pump Motor with Bearing Preload", now abandoned. The Ser. No. 10/550,256 application is a non-provisional application that completed 35 U.S.C. 371 requirements on Sep. 22, 2005, and represents the U.S. national stage entry of international application number PCT/US2004/011403, which was filed on Apr. 14, 2004, and is entitled "Pump Motor with Bearing Preload." This application, the Ser. No. 10/550,256 application and the PCT/US04/11403 application all claim the benefit of priority of U.S. provisional patent application No. 60/462,788, which was filed on Apr. 14, 2003, and is entitled "Pump Motor with Bearing Preload."

BACKGROUND OF THE INVENTION

This invention relates generally to electric motors and more particularly to an electric motor intended to be used with a reciprocating load such as a diaphragm pump. Electric motors often use bearings to reduce friction, particularly rolling element bearings such as ball bearings. Commercially available bearings have some clearance between their individual components, e.g. between the balls and the outer race or the inner race, thereby allowing some degree of radial and axial play. In an application where the motor is connected to a cyclic load, particularly a radial load (i.e. perpendicular to the motor shaft axis) such as that applied by a diaphragm pump, the interaction of the bearing play with the load may cause the motor life to be appreciably reduced through fatigue, fretting of the motor components, and rapid wear.

Attempts have been made to apply a preload to motor bearing assemblies to remove play. However, in operation the motor will be subject to changing internal temperatures, resulting from heat generated by the motor itself or absorbed from the environment in which the motor operates. The parts of the motor responsible for creating the bearing preload condition have differing rates of thermal expansion. This varying thermal expansion may cause the preload on the bearings to be lost, resulting in the accelerated wear described above. The varying thermal expansion may also cause an excessive axial and/or radial load to be placed on the bearings thus also accelerating wear.

Accordingly, it is an object of the invention to provide a motor in which the radial and axial play is eliminated from the bearings thereof.

It is another object of the invention to provide a motor having a consistent preload under all operating conditions.

It is another object of the invention to provide a method of assembling a motor which eliminates radial and axial play from the bearings.

BRIEF SUMMARY OF THE INVENTION

These and other objects of the present invention are achieved in the preferred embodiments disclosed below by providing an electrical machine, including: a housing assembly having first and second ends; a first bearing mounted in the housing, the first bearing having a plurality of rolling elements disposed between first inner and outer races; and a second bearing mounted in the housing and spaced away from the first bearing, the second bearing having a plurality of rolling elements disposed between second inner and outer races.

A rotor assembly having first and second ends is mounted in the first and second bearings, respectively, such that the rotor has a predetermined amount of axial and radial play relative to the housing. A biasing element is disposed between one of the rotor assembly or the housing and one of the bearings. The biasing element urges the rotor assembly to a preloaded position which eliminates the axial and radial play. Each of the first inner and outer races and the second inner and outer races is secured to one of the rotor assembly or to the housing, such that the rotor assembly is retained in the preloaded position.

According to another embodiment of the invention, the first and second outer races are secured to the housing, and the first and second inner races are secured to the shaft.

According to another embodiment of the invention, the biasing element comprises a spring disposed between the rotor assembly and the first or second inner race.

According to another embodiment of the invention, the biasing element is a spring disposed between the housing and the first or second outer race.

According to another embodiment of the invention, the housing assembly includes a generally cylindrical housing including an axially extending portion with a front end plate connected to a front end thereof; and an end bell attached to a rear end of the housing.

According to another embodiment of the invention, the coefficients of thermal expansion of the housing assembly, the bearings, and the rotor are selected so that the rotor assembly will be retained in the preloaded position over a temperature range of about minus 40 degrees Celsius to about 105 degree Celsius.

According to another embodiment of the invention, the bearings are constructed from high carbon chromium steel and the housing assembly and the rotor assembly are constructed from 400 series stainless steel.

According to another embodiment of the invention, a method of assembling an electrical machine includes providing a housing having first and second ends; disposing a first bearing in the housing, the first bearing having a plurality of rolling elements disposed between first inner and outer races; disposing a second bearing in the housing, the second bearing having a plurality of rolling elements disposed between second inner and outer races; and providing a rotor assembly having a longitudinally-extending shaft.

The rotor assembly is rotatably mounted in the housing with the shaft received in the first and second bearings, such that the rotor is in a first position in which it has a predetermined amount of axial and radial play relative to the housing. A biasing element is installed between one of the rotor assembly or the housing and one of the bearings, such that the biasing element forces the rotor assembly to a second position in which the axial and radial play is eliminated. Each of the first inner and outer races and the second inner and outer races is secured to one of the rotor assembly or to the housing, such that the rotor assembly is retained in the second position.

According to another embodiment of the invention, the first and second outer races are secured to the housing, and the first and second inner races are secured to the shaft.

According to another embodiment of the invention, the biasing element comprises a spring disposed between the housing and the first or second outer race.

According to another embodiment of the invention, each of the first inner and outer races and the second inner and outer races is secured by a method selected from the group consisting of: press fitting, adhesive bonding, welding, or brazing.

According to another embodiment of the invention, an electric motor, includes a generally cylindrical housing assembly having first and second ends, the housing defining first and second spaced-apart bearing pockets; a first bearing having a plurality of rolling elements disposed between first inner and outer races, the first outer race being received in the first bearing pocket; a second bearing having a plurality of rolling elements disposed between second inner and outer races, the second outer race being received in the second bearing pocket; and a rotor assembly including a shaft received in the first and second inner races, such that the rotor has a predetermined amount of axial and radial play relative to the housing.

A biasing element is disposed between one of the rotor assembly or the housing and one of the bearings which urges the rotor assembly to a preloaded position which eliminates the axial and radial play. The first inner and outer races are secured to the shaft, and the second inner and outer races are secured to the housing, such that the rotor assembly is retained in the preloaded position.

According to yet another embodiment of the invention, a method of assembling a non-reciprocating motor adapted for driving a reciprocating load includes a first bearing, a second bearing, and a rotor assembly having a shaft, all having corresponding predetermined coefficients of thermal expansion. The first and second bearings are positioned in the housing. The rotor assembly is rotatably mounted in the housing with the shaft received in the first and second bearings, such that the rotor is in a first position in which it has a predetermined amount of axial and radial play relative to the housing. A biasing element is installed and forces the rotor assembly to a second position in which play is eliminated. Each race is then permanently secured such that the rotor assembly is retained in the second position over a temperature range of about minus 40 degrees to about 105 degrees Celsius.

BRIEF DESCRIPTION OF THE DRAWINGS

The subject matter that is regarded as the invention may be best understood by reference to the following description taken in conjunction with the accompanying drawing figures in which.

DETAILED DESCRIPTION OF THE INVENTION

Figure 1:
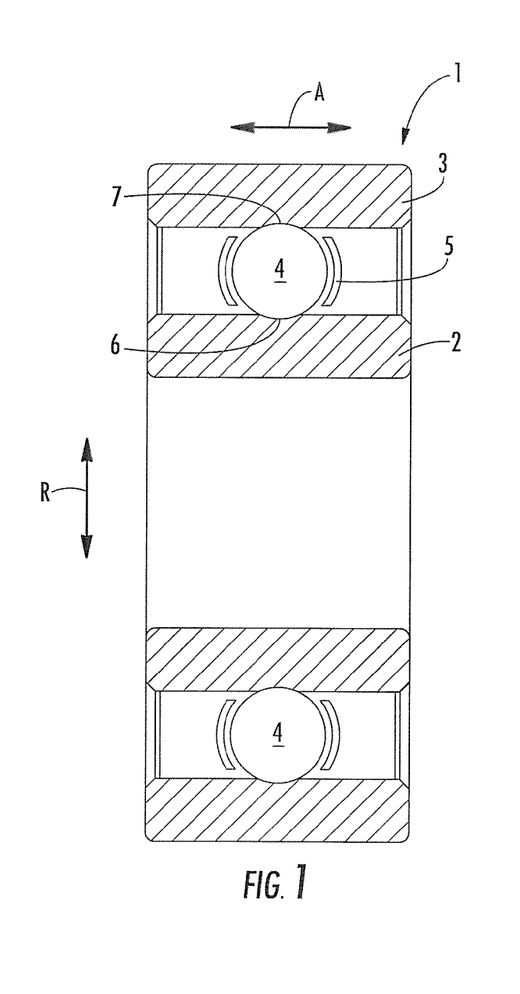
FIG. 1 is a side elevational view of a ball bearing in a rest condition.

Referring to the drawings wherein identical reference numerals denote the same elements throughout the various views, FIG. 1 shows a schematic view of a typical ball bearing 1 including generally cylindrical, concentrically disposed inner and outer races 2 and 3. An array of balls 4 are mounted between the races. The balls 4 may be separated and located by a cage 5 as shown. The balls 4 are received in arcuate grooves 6 and 7 formed in the inner and outer races respectively. The grooves have a radius of curvature greater than the radius of the balls 4, so that when assembled the balls 4 will have a point contact with the races. Because of spacing between the various elements, the bearing 1 has a radial clearance in the direction denoted "R", and an axial clearance in the direction denoted "A". These clearances allow relative radial and axial motion between the inner race 2 and the outer race 3.

Figure 2:
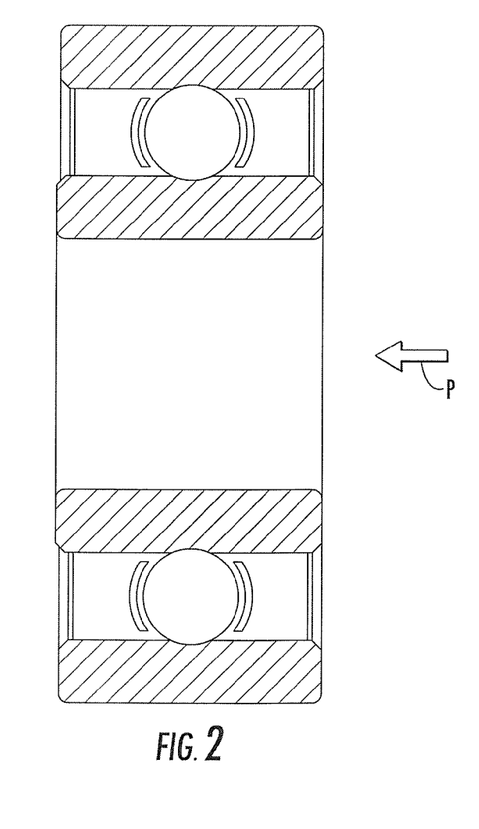
FIG. 2 is a side elevational view of the ball bearing of FIG. 1 in a preloaded condition.
Figure 3:
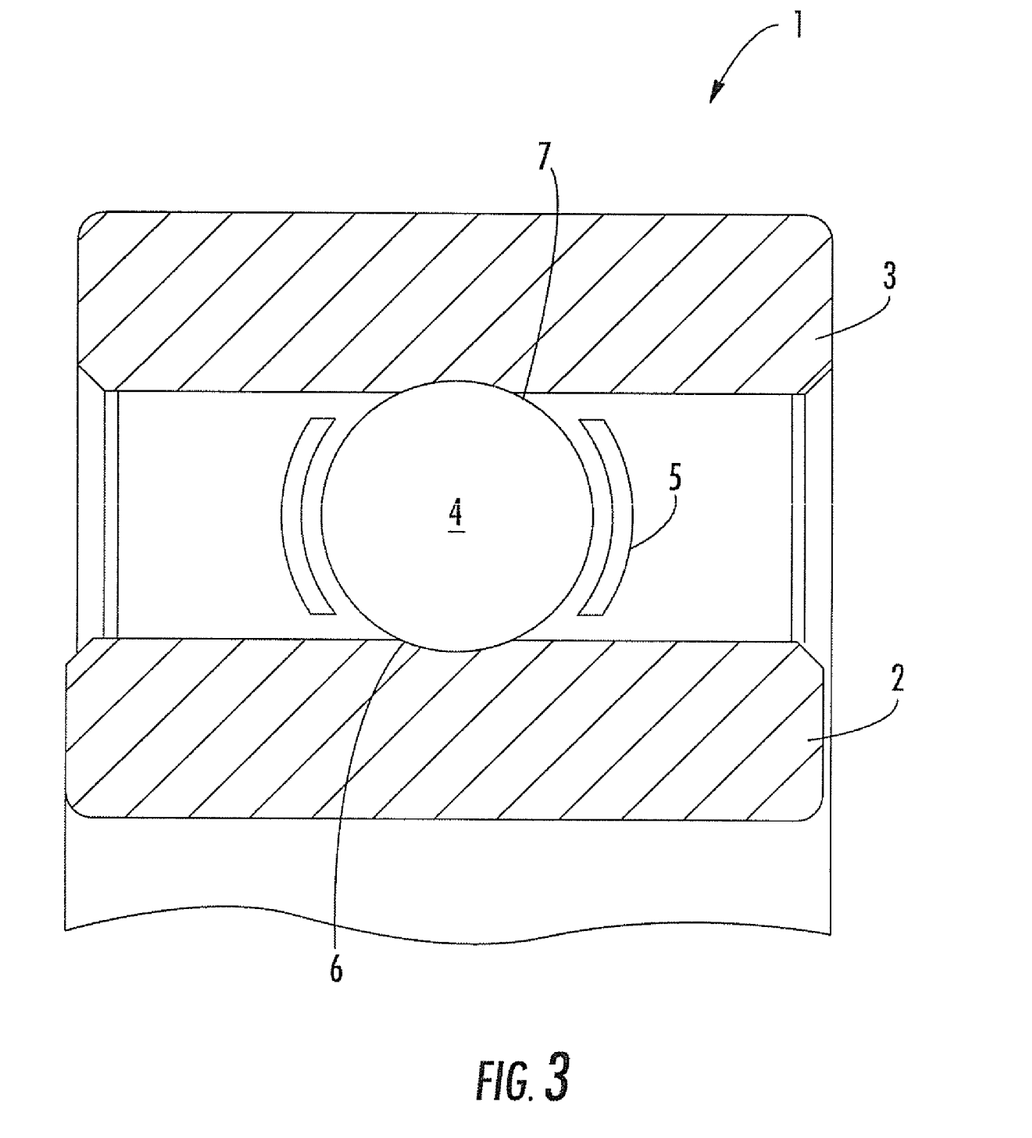
FIG. 3 is enlarged view of a portion of the bearing of FIG. 2.

FIG. 2 depicts the bearing 1 in a preloaded condition. An axial preload force is applied to the bearing 1 in the direction of arrow P. This causes the inner race 2 to shift axially with respect to the outer race 3. As shown more clearly in FIG. 3, the axial motion is stopped by the interference of the balls 4 with the grooves in the inner and outer races 2 and 3. Additionally, because of the arcuate shape of the grooves, relative axial motion of the bearing races causes a wedging effect which prevents relative radial motion between the inner and outer races. Thus, an axial preload may be used to remove both axial and radial play from a ball bearing.

Figure 4:
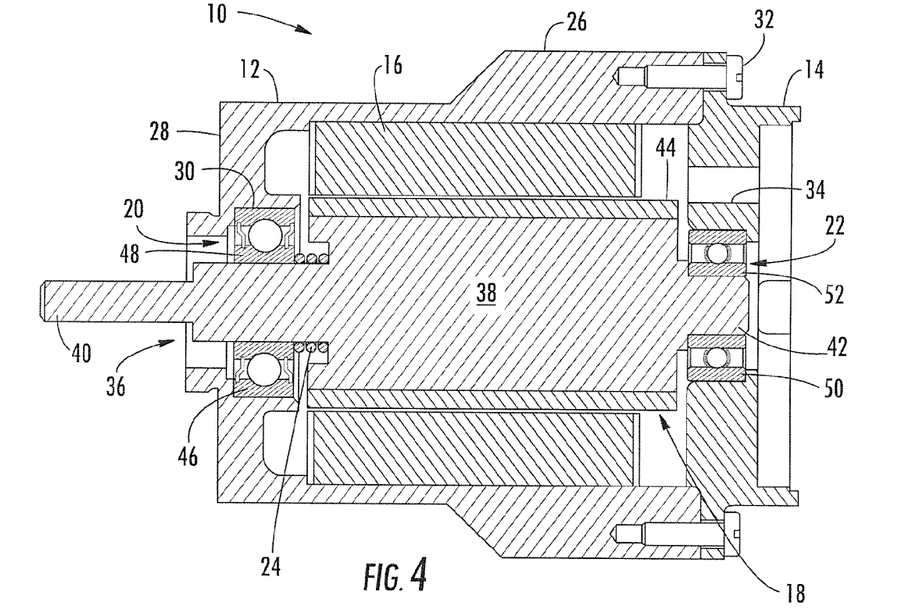
FIG. 4 is a side elevational view of a first embodiment of a motor constructed in accordance with the present invention.

Turning now to the present invention, FIG. 4 shows a first embodiment of a motor 10 constructed in accordance with the present invention. The illustrated example is of a brushless permanent magnet DC motor, but the operative principle of the present invention is equally application to other types of motors as well. The basic components of the motor 10 are a housing 12, an end bell 14, a stator 16, a rotor assembly 18, a front bearing 20, a rear bearing 22, and a spring 24. The housing 12 is a generally cylindrical, open-ended member including an axially extending portion 26 and a front end plate 28 which has a front bearing pocket 30 formed therein. The front end plate portion of the housing 12 could also be a separate component attached by a variety of methods, for example, screws, press fit, welding, etc. The housing 12 may be formed by any known method including casting, forging, machining, powder metallurgy, etc. The end bell 14 is a member adapted to close off the rear end of the housing 12 and is attached to the rear end of the housing 12, for example by the machine screws 32 shown in FIG. 4. The end bell 14 has a rear bearing pocket 34 formed therein. The stator 16 is of a known type comprising an array of flat plates wound with coils of wire. The rotor assembly 18 comprises a shaft 36 having a central portion 38, an axially extending front shaft extension 40, and an axially extending rear shaft extension 42. A plurality of permanent magnets 44 are secured to the outer surface of the central portion, for example with an adhesive. The front bearing 20 is of a known rolling-element type such as a ball bearing. Its outer race 46 is received in the front bearing pocket 30, and its inner race 48 receives the front shaft extension 40 of the rotor assembly 18. The rear bearing 22 is also of a known rolling-element type such as a ball bearing. Its outer race 50 is received in the rear bearing pocket 34, and its inner race 52 receives a portion of the rear shaft extension 42. In the illustrated example the spring is a compression-type coil spring. However, the spring 24 may be of any type which fits in the space provided for it and which provides the required preload force. A Belleville spring washer could be used, for example.

The motor 10 is assembled so that a preload is applied to the bearings 20 and 22 which removes all axial and radial play in each bearing as described above. The preload is applied such that the inner races of the bearings are axially biased in opposite directions. An exemplary assembly sequence is as follows. The rear bearing 22 is assembled to the end bell 14. The outer race 50 of the rear bearing 22 is secured to the end bell 14 so that it cannot move relative to the end bell 14, for example by press fit, adhesive, tack welding, brazing, or the like. The front bearing 20 is then assembled to the housing 12. The outer race 46 of the front bearing 20 is secured to the housing 12 so that it cannot move relative to the housing 12, in a manner similar to the rear bearing 22.

The spring 24 is then assembled to the front shaft extension 40 of the rotor assembly 18, and the rotor assembly 18 is then inserted in the housing 12. One end of the spring 24 bears against the inner race 48 of the front bearing 20 and the other end of the spring 24 bears against the central portion 38 of the rotor assembly 18. The end bell 14 is subsequently attached to the housing 12 which places the rear shaft extension 42 into the inner race 52 of the rear bearing 22. The action of the compressed spring 24 forces the inner races of each bearing outward into a condition where all axial and radial play is eliminated. This creates a preload force of a magnitude determined by the characteristics of the spring 24.

Finally, the inner race 48 of the front bearing 20 is secured to the front shaft extension 40, and the inner race 52 of the rear bearing 22 is secured to rear shaft extension 42, so that no relative motion can take place between either of the inner races and the rotor assembly 18. The inner races may be secured to the rotor assembly 18 by a variety of methods, as described above. Thus, the components of the motor 10 are secured in a position which maintains the preload created by the spring 24 during the assembly process. The arrangement eliminates all axial and radial play from the bearings and shaft.

Figure 5:
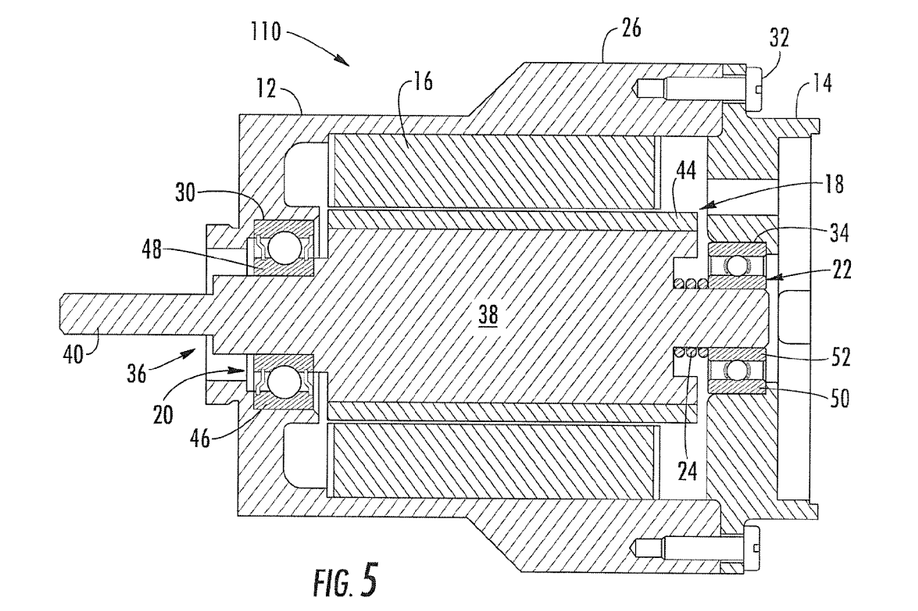
FIG. 5 is a side elevational view of a first alternative arrangement of the components of the motor of FIG. 4.

FIG. 5 illustrates a motor 110 which is a variation of the motor 10 depicted in FIG. 4. In this instance, the spring 24 is placed over the rear shaft extension 42 of the rotor assembly 18, between the central portion 38 of the shaft 36 and the inner race 52 of the rear bearing 22. The assembly and operation of the motor 110 is otherwise similar to that of the example illustrated in FIG. 4 and described above.

Figure 6:
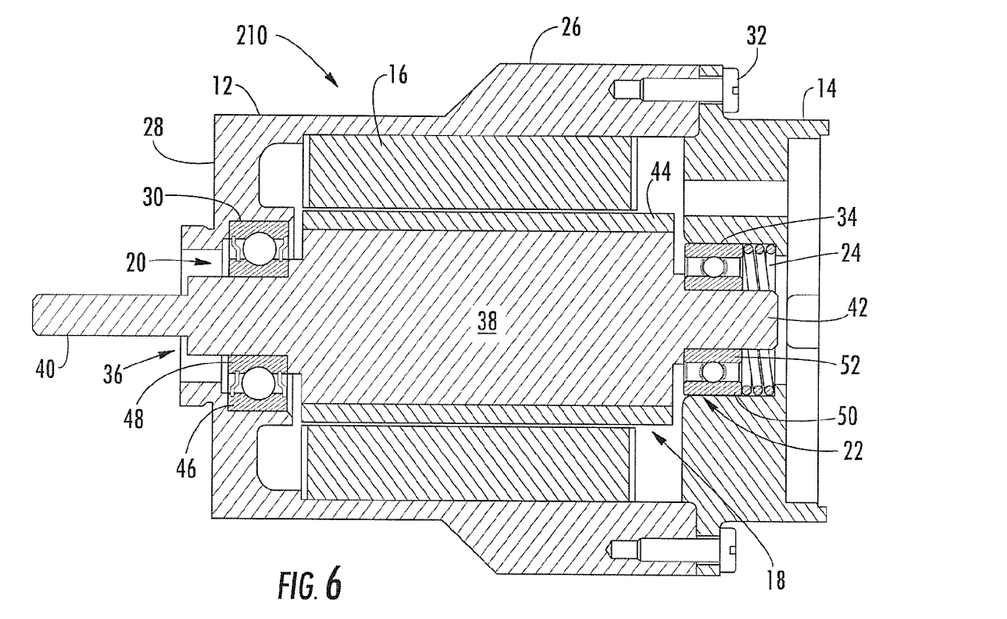
FIG. 6 is a side elevational view of a second alternative arrangement of the components of the motor of FIG. 4.

FIG. 6 illustrates another variation 210 of the motor 10. The construction is again generally similar to that illustrated in FIG. 4 above, the primary difference being that the spring 24 bears on the outer race of the bearings, as described in detail below.

Assembly of the motor 210 starts with the front bearing 20 being assembled to the housing 12. The outer race 46 of the front bearing 20 is secured to the housing 12 so that it cannot move relative to the housing 12, for example by press fit, adhesive, tack welding, brazing, or the like. The rotor assembly 18 is assembled to the housing 12. The inner race 48 of the front bearing 20 is secured to the front shaft extension 40 so that it cannot move relative to the front shaft extension 40.

The rear bearing 22 is then assembled to the rotor assembly 18. The inner race 52 of the rear bearing 22 is secured to the rear shaft extension so it cannot move relative to the rear shaft extension. The spring 24 is assembled to the end bell 14, being inserted in the rear bearing pocket. The end bell 14 is then assembled to the housing 12 which inserts the rear bearing 22 into the end bell 14. The spring 24 thus mates between the end bell 14 and the outer race 50 of the rear bearing 22.

The action of the compressed spring 24 forces the inner races of each bearing outward into a condition where all axial and radial play is eliminated. This creates a preload force of a magnitude determined by the characteristics of the spring 24.

Finally, the outer race 50 of the rear bearing 22 is secured to the end bell 14, so that no relative motion can take place between the outer race 50 and the end bell 14. The outer race 50 may be secured to the end bell 14 by a variety of methods, as described above. Thus, the components of the motor 210 are secured in a position which maintains the preload provided by the spring 24 during the assembly process. This arrangement eliminates all axial and radial play from the bearing/shaft mechanism.

Figure 7:
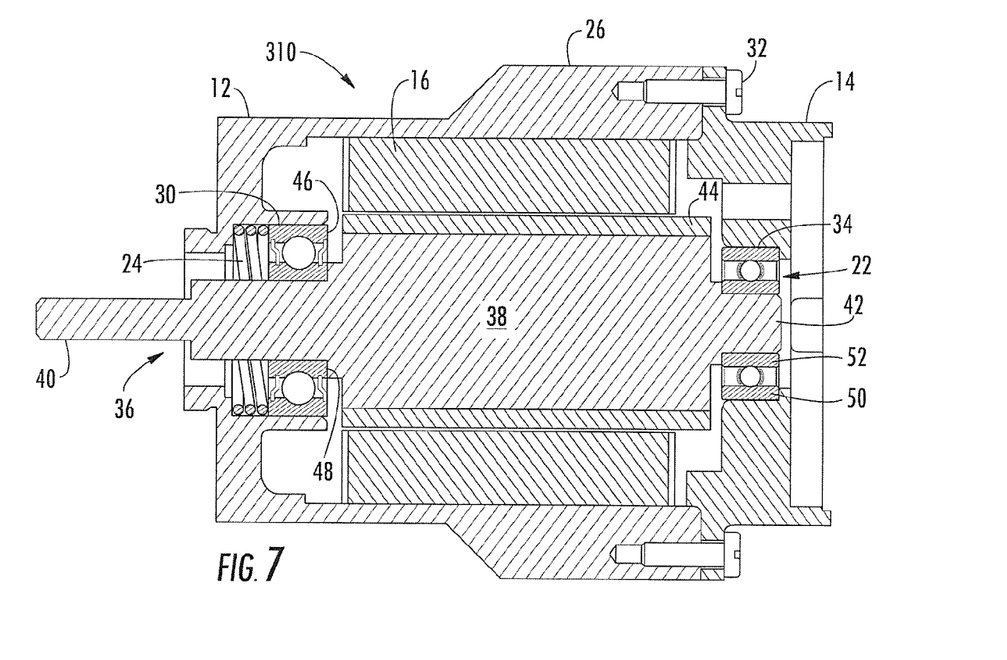
FIG. 7 is a side elevational view of a third alternative arrangement of the components of the motor of FIG. 4.

FIG. 7 illustrates a variation 310 of the motor 210. In this instance, the spring 24 is placed over the front shaft extension 40 of the rotor assembly 18, between the housing 12 and the outer race 50 of the rear bearing 22. The assembly and operation of this variation is otherwise similar to that of the example illustrated in FIG. 6 and described above.

Figure 8:
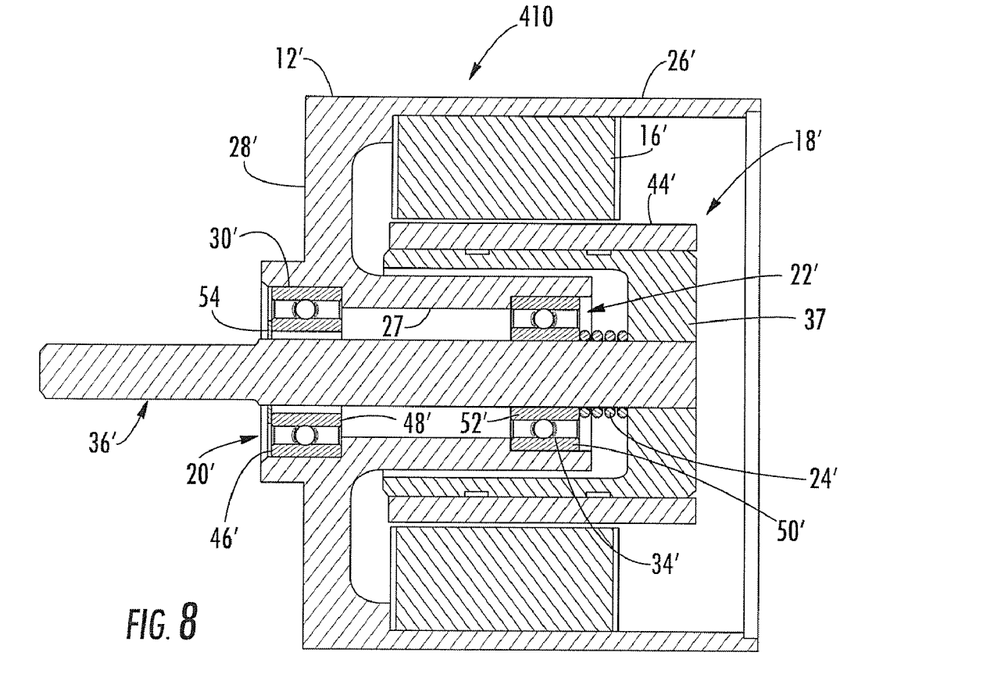
FIG. 8 is a side elevational view of a second embodiment of a motor constructed in accordance with the present invention.

FIG. 8 shows a second embodiment of a motor 410 constructed in accordance with the present invention. This type of motor is sometimes referred to as a cantilevered design because of the relationship of the rotor assembly to the bearings. Elements in common with the motors depicted in FIGS. 4-7 are shown in prime reference numerals. The basic components of the motor 410 are a housing 12', a stator 16', a rotor assembly 18', a front bearing 20', a rear bearing 22', and a preload spring 24'. The housing 12' is a generally cylindrical, open-ended member including outer axially extending portion 26', an inner axially extending portion 27, and a front end plate 28'. The inner axially extending portion 27 defines a front bearing pocket 30' and a rear bearing pocket 34'. The housing 12' may be formed by any known method including casting, forging, machining, powder metallurgy, etc. The stator 16' is of a known type comprising an array of flat plates wound with coils of wire. The rotor assembly 18' comprises a shaft 36', a magnet hub 37 attached to the rear end of the shaft 36', and a plurality of permanent magnets 44' secured to the outer surface of the magnet hub 37, for example with an adhesive. The front bearing 20' is of a known rolling-element type such as a ball bearing. Its outer race 46' is received in the front bearing pocket 30', and its inner race 48' receives the front shaft extension 40' of the rotor assembly 18'. The rear bearing 22' is also of a known rolling-element type such as a ball bearing. Its outer race 50' is received in the rear bearing pocket 34', and its inner race 52' receives a portion of the shaft 36'. In the illustrated example the spring is a compression-type coil spring. However, the spring 24' may be of any type which fits in the space provided for it and which provides the required preload force. A Belleville spring washer could be used, for example.

The motor 410 is assembled so that a preload is applied to the bearings 20' and 22' which removes all axial and radial play in each bearing as described above. The preload is applied such that the bearings are axially biased in opposite directions. An exemplary assembly sequence is as follows. First, the spring 24' is assembled to the rotor assembly 18'. The rear bearing 22' is assembled to the housing 12'. The outer race 50' of the rear bearing 22' is secured to the housing 12' so that no relative motion can take place between the outer race 50' and the housing 12', for example by press fit, tack welding, brazing, adhesive, etc.

The front bearing 20' is assembled to the housing 12'. The outer race 46' of the front bearing 20' is secured to the housing 12' so that no relative motion can take place between the outer race 46' and the housing 12'.

Next, the rotor assembly 18' is assembled to the housing 12', placing the shaft 36' into the inner races of each bearing. A lock ring 54 is then assembled to the front end of the shaft 36'. This compresses the spring 24'. The action of the compressed spring 24' forces the inner races of each bearing inward into a condition where all axial and radial play is eliminated. This creates a preload force of a magnitude determined by the characteristics of the spring 24'.

Finally, the inner races of both the front bearing 20' and the rear bearing are secured to the shaft 36' so that no relative motion can take place between the inner races and the shaft 36', in a manner described above. This arrangement eliminates all axial and radial play from the bearing and shaft mechanism.

Figure 9:
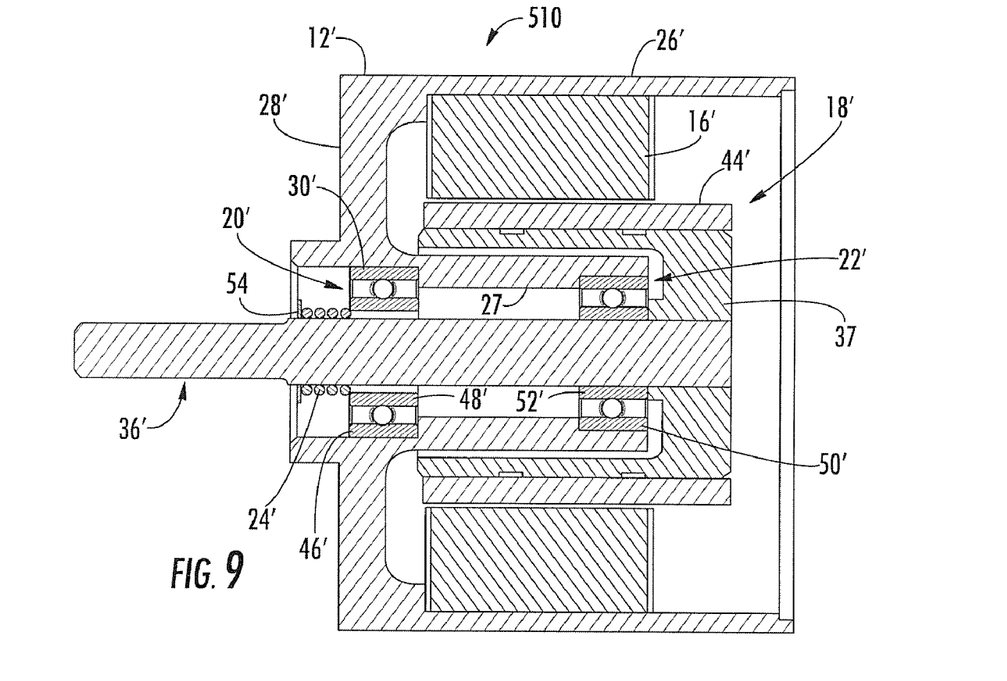
FIG. 9 is a side elevational view of a first alternative arrangement of the components of the motor of FIG. 8.

FIG. 9 illustrates a motor 510 which is a variation of the motor 410 depicted in FIG. 8. In this instance, the spring 24' is placed over the front end of the shaft 36' between the lock ring 54 and the inner race 48' of the front bearing 20'. The assembly and operation of the motor 510 is otherwise similar to that of the example illustrated in FIG. 8 and described above.

Figure 10:
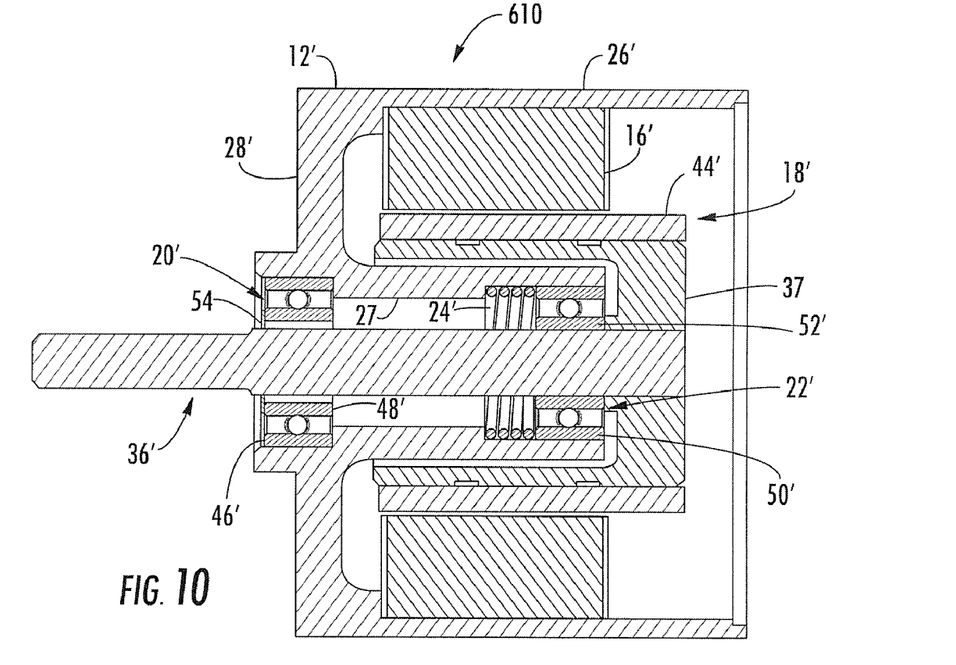
FIG. 10 is a side elevational view of a second alternative arrangement of the components of the motor of FIG. 8.

FIG. 10 illustrates another variation 610 of the motor 410. The construction is again generally similar to that illustrated in FIG. 8 above, the primary difference being that the spring 24' bears on the outer race of the bearings, as described in detail below.

First, the spring 24' is assembled to the housing 12'. The rear bearing 22' is then assembled to the rotor assembly 18'. The inner race 52' of the rear bearing 22' is secured to the shaft so that no relative motion can take place between the inner race 52' and the shaft 36', for example by press fit, tack welding, brazing, adhesive, etc.

The front bearing 20' is assembled to the housing 12'. The outer race 46' of the front bearing is secured to the housing 12' so that no relative motion can take place between the outer race 46' and the housing 12', in a manner described above.

The rotor assembly 18' is assembled to the housing 12'. This places the shaft 36' into the inner race 48' of the front bearing 20'. A lock ring 54 is then assembled to the shaft 36'. This compresses the spring 24'. The action of the compressed spring 24' forces the inner races of each bearing inward into a condition where all axial and radial play is eliminated. This creates a preload force of a magnitude determined by the characteristics of the spring 24'.

Finally, the inner race of the front bearing 20' is secured to the shaft 36 and the outer race 50' of the rear bearing 22' is secured to the housing 12' so that no relative motion can take place between these components, in a manner described above. This arrangement eliminates all axial and radial play from the bearing and shaft mechanism.

Figure 11:
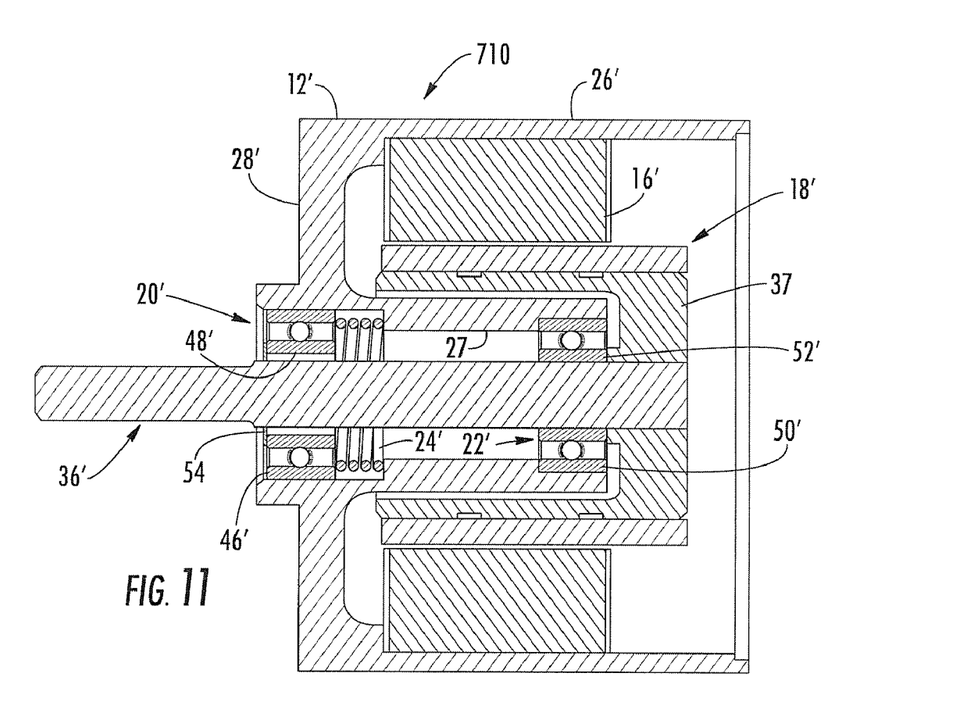
FIG. 11 is a side elevational view of a third alternative arrangement of the components of the motor of FIG. 8.

FIG. 11 illustrates a motor 710 which is a variation of the motor 610 depicted in FIG. 10. In this instance, the spring 24' is placed over the front end of the shaft 36' between end of the front bearing pocket 30' and the outer race 46' of the front bearing 20'. The assembly and operation of the motor 710 is otherwise similar to that of the example illustrated in FIG. 10 and described above.

While several basic configurations and methods of assembly have been described above, it is noted that the specific configuration or assembly sequence is not critical to the present invention. Rather, it is important that a preload be applied to remove axial and radial play from the rotor and bearing assemblies, and that the inner and outer race of each of the bearings be secured such that no relative motion can take place between the race and the mating component. Furthermore, a preload must be maintained over the motor's operating temperature range adequate to preserve a zero-play condition in the axial and radial directions, under the expected loads. This is accomplished by the selection of materials used for the housing, rotor assembly, and bearings based on their coefficients of thermal expansion. The difference in coefficients of thermal expansion of the various components is minimized. Furthermore, the absolute value of the coefficient of linear thermal expansion of each component is minimized, because even if all of the components are of the same material, excessive thermal expansion will cause loss of the bearing preload if the coefficient of linear thermal expansion is too high. Examples of materials which are known to exceed the required coefficient of linear thermal expansion include brass, zinc, and aluminum.

An example of a suitable combination of materials is as follows. The bearings may be made of a stainless steel alloy such as high carbon chromium steel, JIS G4805/SUJ2. This is consistent with the alloys used in commercially available ball bearings, and provides a baseline for the coefficient of linear thermal expansion to be matched by the other motor components. Accordingly, the housing, shaft and end bell may be made from a stainless steel alloy, such as a 400-series alloy. Alternatively, some of these parts could be made from a low-carbon steel. This combination of materials will preserve an adequate preload over the operating temperature of a typical motor, for example from about minus 40 degrees Celsius (minus 40 degrees Fahrenheit) to about 105 degrees Celsius (220 degrees Fahrenheit).

The foregoing has described a motor assembly for use with a reciprocating load such as a diaphragm pump. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A method of assembling a pump motor and preloading bearings of the motor, the method comprising the steps of:
   providing a housing and an end bell for attachment to the housing;
   providing a first bearing and a second bearing each having a plurality of rolling elements disposed between an inner race and an outer race;
   providing a rotor assembly comprising a longitudinally-extending shaft;
   securing the outer race of the first bearing to the housing and securing the outer race of the second bearing to the end bell;
   providing a spring and assembling the spring on the shaft of the rotor assembly;
   inserting the rotor assembly into the housing such that a first end of the spring bears against the inner race of the first bearing and a second end of the spring bears against a portion of the rotor assembly;
   attaching the end bell to the housing such that the shaft is received through the inner race of the second bearing and the spring is compressed and forces the inner race of each of the first and second bearings apart; and
   subsequent the step of forcing the inner race of each of the first and second bearings apart, securing the inner race of each of the first and second bearings to the shaft to prevent relative motion between each of the inner race of each of the first and second bearings and the shaft.

2. The method of claim 1 wherein the first and second bearings are constructed from high carbon chromium steel and the housing and the rotor assembly are constructed from 400 series stainless steel.

3. The method of claim 1 wherein the housing, the rotor assembly, and the first and second bearings are made of a stainless steel alloy.

4. The method of claim 1 wherein the first and second bearings are made of high carbon chromium steel, and the housing, the shaft and the end bell are made of a stainless steel alloy.

5. The method of claim 1 wherein the housing and the end bell are generally cylindrical and each define a bearing pocket, and wherein the outer race of the first bearing is secured within the bearing pocket of the housing and the outer race of the second bearing is secured within the bearing pocket of the end bell.

* * * * *